United States Patent
Chetlur et al.

(10) Patent No.: US 8,862,814 B2
(45) Date of Patent: Oct. 14, 2014

(54) VIDEO OBJECT PLACEMENT FOR COOPERATIVE CACHING

(75) Inventors: Malolan Chetlur, Karnataka (IN); Umamaheswari C. Devi, Bangalore (IN); Shivkumar Kalyanaraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 13/206,612

(22) Filed: Aug. 10, 2011

(65) Prior Publication Data

US 2013/0042071 A1 Feb. 14, 2013

(51) Int. Cl.
- G06F 12/00 (2006.01)
- H04N 21/231 (2011.01)
- H04L 29/06 (2006.01)
- G06F 17/30 (2006.01)
- H04L 29/08 (2006.01)
- H04N 21/2225 (2011.01)
- G06F 12/08 (2006.01)

(52) U.S. Cl.
CPC ...... *H04L 67/2842* (2013.01); *H04N 21/23116* (2013.01); *H04L 65/00* (2013.01); *G06F 12/0866* (2013.01); *G06F 12/0804* (2013.01); *H04L 65/4084* (2013.01); *G06F 17/30* (2013.01); *H04L 67/288* (2013.01); *H04N 21/23113* (2013.01); *H04N 21/2225* (2013.01); *H04L 65/80* (2013.01)
USPC ...................................................... 711/113

(58) Field of Classification Search
USPC ...................................................... 711/113
See application file for complete search history.

(56) References Cited

U.S. PATENT DOCUMENTS

| | | | |
|---|---|---|---|
| 7,146,429 B2 | 12/2006 | Michel | |
| 7,315,930 B2 | 1/2008 | Karlsson et al. | |
| 7,655,367 B2 | 2/2010 | Buurman et al. | |
| 7,840,179 B2 | 11/2010 | Isobe et al. | |
| 7,908,389 B2 | 3/2011 | Zuckerman et al. | |
| 2002/0026560 A1 | 2/2002 | Jordan et al. | |
| 2002/0133537 A1* | 9/2002 | Lau et al. | 709/203 |
| 2002/0184403 A1* | 12/2002 | Dahlin et al. | 709/316 |
| 2005/0097285 A1 | 5/2005 | Karamanolis et al. | |

OTHER PUBLICATIONS

Zhao et al. Cooperative Caching in Wireless P2P Networks: Design, Implementation, and Evaluation, IEEE Transactions on Parallel and Distributed Systems, V. 21, N. 2, pp. 229-241, Feb. 2010.

(Continued)

*Primary Examiner* — Matthew Bradley
*Assistant Examiner* — Craig Goldschmidt
(74) *Attorney, Agent, or Firm* — Ryan, Mason & Lewis, LLP

(57) ABSTRACT

A method, an apparatus and an article of manufacture for placing at least one object at least one cache of a set of cooperating caching nodes with limited inter-node communication bandwidth. The method includes transmitting information from the set of cooperating caching nodes regarding object accesses to a placement computation component, determining object popularity distribution based on the object access information, and instructing the set of cooperating caching nodes of at least one object to cache, the at least one node at which each object is to be cached, and a manner in which the at least one cached object is to be shared among the at least one caching node based on the object popularity distribution and cache and object sizes such that a cumulative hit rate at the at least one cache is increased while a constraint on inter-node communication bandwidth is not violated.

23 Claims, 9 Drawing Sheets

(56) References Cited

OTHER PUBLICATIONS

Applegate et al. Optimal Content Placement for a Large-Scale Vod System, in ACM Co-NEXT, 2010.
Borst et al., Distributed Caching Algorithms for Content Distribution Networks, in INFOCOM, 2010.
Breslan et al., Web Caching and Zipf-Like Distributions: Evidence and Implications. In Proceedings of IEEE INFOCOM, pp. 126-134, 1999.
Chankhunthod et al., A Hierarchical Internet Object Cache, in USENIX Annual Technical Conference, pp. 153-163, Sep. 1996.
Fan et al., Summary Cache: A Scalable Wide-Area Web Cache Sharing Procotol, in SIGCOMM, pp. 254-265, Sep. 1998.
Hafeeda et al., Traffic Modeling and Proportional Partial Caching for Peer-to-Peer Systems, IEEE/ACM Transactions on Networking, 16(6)1447-1460, 2008.
Han et al., Hulu in the Neighborhood, in COMSNETS, 2011.
Kangasharju et al., Object Replication Strategies for Content Distribution Networks, Computer Communication Journal, 25(4):376-383, 2002.
Korupolu et al., Placement Algorithms for Hierarchical Cooperative Caching, in SODA, pp. 586-595, 1998.
Song et al., Cobweb: Optimal Resource Utilization in Content Distribution Networks, in SOSP, 2005, poster.
Venkataramani et al., Bandwidth Constrained Placement in a Wan, in Principles of Distributed Computing, pp. 134-143, 2001.
Xu et la., Qos-Aware Object Replica Placement in CDNS, in GLOBECOM, 2005.
Baev et al., Approximation Algorithms for Data Placement Problems, pp. 1-18, 2001.

* cited by examiner

1: $b$ : array $1..M$ of real sorted decending {object bandwidths}
2: $shr\_from$ : integer {starting index of unreplicated and shared objects in $\mathcal{O}_C$}
3: $L$ : integer {no. of objects in $\mathcal{O}_C$ that are unreplicated and shared}
4: $B_{top}$ : real {total bandwidth of unreplicated and shared objects in $\mathcal{O}_C$}
5: $B_{inc}$ : real {total bandwidth of unreplicated and shared objects in $\mathcal{O}_C$}
6: {Determine the objects with total bandwidth at most $B/(N-1)$ at the tail of the objects in $\mathcal{O}_C$}
7: $i := K$; {$K$ is the no. of objects that can be held in a cache}
8: $B_{top} := 0$;
9: while $B_{top} + b[i] \leq B/(N-1)$ do
10:   $B_{top} := B_{top} + b[i]$;
11:   $i := i - 1$;
12: end while
13: $shr\_from := i + 1$;
14: $L := K - shr\_from + 1$;
15: /* Select $(N-1) \cdot L$ objects from $\overline{\mathcal{O}}_C$*/
16: $B_{inc} := \sum_{i=K+1}^{K+(N-1) \cdot L} b[i]$
17: $\mathcal{O}_{shared} :=$ objects $K - L + 1 \ldots K + (N-1) \cdot L$;
18: while $NB/(N-1) > B_{inc} + B_{top}$ do
19:   /* Check if unreplicating and sharing the next lowest bandwidth object from $\mathcal{O}_C$ can increase the total bandwidth of objects from $\overline{\mathcal{O}}_C$ brought into the combined cache and shared */
20:
21:   if $b[shr\_from - 1] + \sum_{i=K+(N-1)L+1}^{K+(N-1)(L+1)} b[i] + B_{inc} + B_{top} \leq NB/(N-1)$ then
22:     $shr\_from := shr\_from - 1; L := L + 1$;
23:     $B_{top} := B_{top} + b[shr\_from]$;
24:     $B_{inc} := B_{inc} + \sum_{i=K+(N-1)L+1}^{K+(N-1)(L+1)} b[i]$;
25:     Update $\mathcal{O}_{shared}$ to include the newly selected objects;
26:   end if

*FIG. 1 cont.* ⨍ 102

27: end while
/* Distribute the objects in $O_{shared}$ using a balanced fit
28: heuristic such that the total bandwidth of all objects assigned
to any node is at most $B/(N - 1)$ */
29: for each object with index $O$ in $O_{shared}$ do
30:     /* consider objects in non-increasing order of their bandwidths */
assign $O$ to the node with the largest unused ICCB among
31:     those with spare physical slots if such a node exists and unused
ICCB at the node is at least $(N - 1) \cdot b[O]$;
32:     mark $O$ as totally shared from the node caching it;
33: end for
assign the remaining objects in $O_{shared}$ to nodes with available
34: physical slots; mark them unshared

VIDEO OBJECT PLACEMENT FOR COOPERATIVE CACHING

FIELD OF THE INVENTION

Embodiments of the invention generally relate to information technology, and, more particularly, to cooperative caching.

BACKGROUND OF THE INVENTION

Data and Video-on-Demand (VoD) traffic delivered over mobile networks are projected to grow tremendously in the coming years. Current wireless infrastructures are not provisioned to handle such growth. The projected growth is hence expected to significantly increase the stress on not just the wireless channel, but also the wired backhaul and core of a cellular network. Wireless network operators therefore seek optimizations that can ease this pressure and help defer infrastructure upgrades.

Caches deployed at the edge elements, such as base stations and central controllers (CC) (for example, RNC in a 3G network), of a broadband wireless network are one way of alleviating the traffic stress expected in the wireless backhaul and core due to the projected growth in mobile video traffic. Limits on the sizes of the base station caches and restrictions on frequent upgrades to the hardware necessitate exploring techniques that can increase the hit rates with the growing traffic given the constraints. One way of increasing the hit rates is by increasing the effective cache size by enabling cooperation and sharing of objects among the caching nodes.

Cooperative caching has been studied for traditional wired networks. However, existing approaches assume that the caching nodes are placed on a high-speed network, and hence, that bandwidth available for inter-cache communication is not a constraint. Also, most existing approaches focus on minimizing the average object access latency. In contrast, the bandwidth available for interbase station (inter-BS) or inter-CC communication in the wireless edge is limited, and a need exists to reduce the network traffic in the backhaul and core by reducing the byte miss ratio in the edge.

SUMMARY OF THE INVENTION

In one aspect of the present invention, techniques for video object placement for cooperative caching are provided. An exemplary computer-implemented method for placing at least one object at at least one cache of a set of cooperating caching nodes with limited inter-node communication bandwidth can include steps of transmitting information from the set of cooperating caching nodes regarding object accesses to a placement computation component, determining object popularity distribution based on the object access information, and instructing the set of cooperating caching nodes of at least one object to cache, the at least one node at which each object is to be cached, and a manner in which the at least one cached object is to be shared among the at least one caching node based on the object popularity distribution and cache and object sizes such that a cumulative hit rate at the at least one cache is increased while a constraint on inter-node communication bandwidth is not violated.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram containing a list of an object placement algorithm PA, according to an embodiment of the present invention;

DETAILED DESCRIPTION OF EMBODIMENTS

Figure 2:
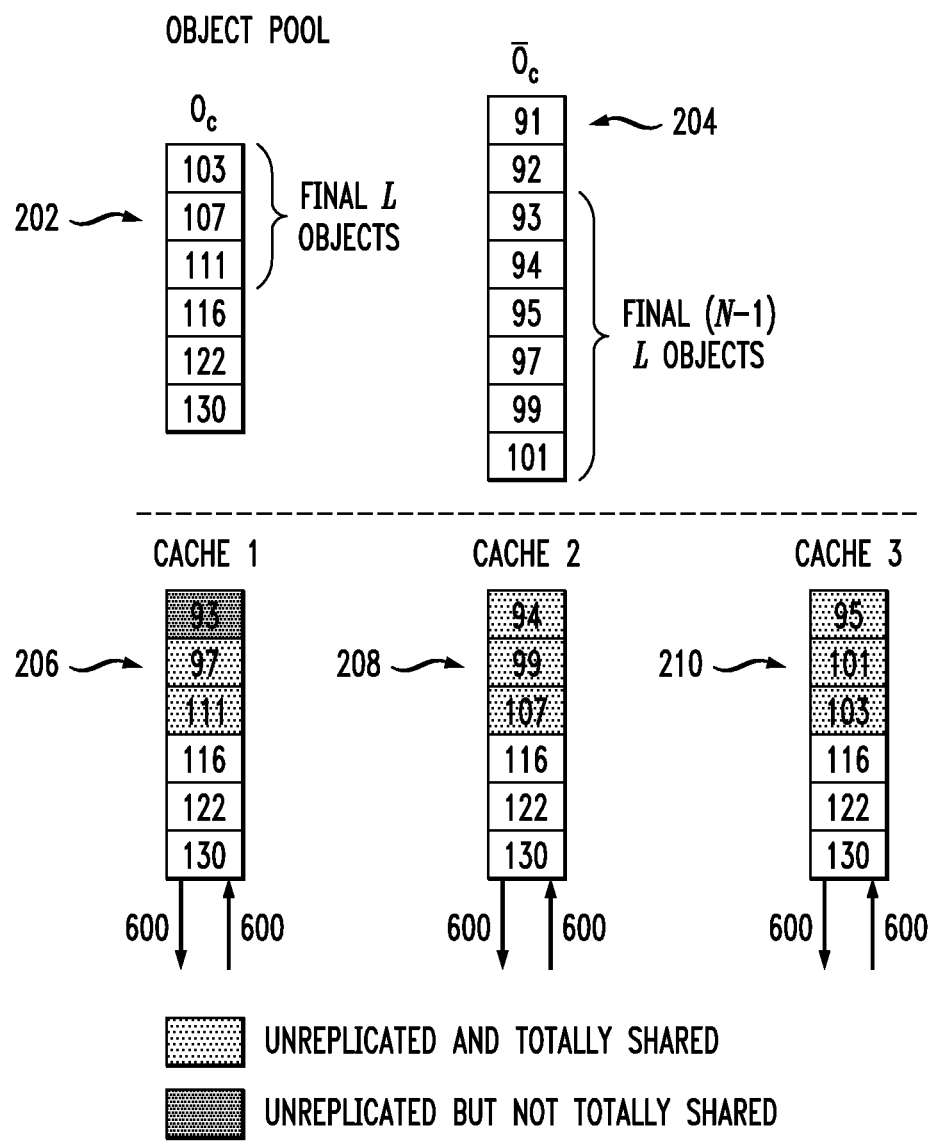
FIG. 2 is a diagram illustrating a placement example, according to an embodiment of the present invention.

As described herein, an aspect of the present invention includes video object placement for cooperative caching in bandwidth-constrained broadband wireless backhaul networks. In describing one or more embodiments of the invention herein, particular references will often be made to the 3G wireless network. However, it should be noted that the techniques detailed herein are not limited to 3G networks but are also applicable to other types of wireless broadband networks and even wired networks if the bandwidth available for communication among peer caching nodes is a constraint. One embodiment of the invention includes placing objects in a set of cooperating caches such that the hit rate of the edge caches is optimized subject to not violating the inter-cache communication bandwidth (ICCB) constraints.

The edge elements are connected via bandwidth-constrained links, and hence, the assumption made in most existing approaches that the cooperating nodes are located on a high-speed network and the solutions proposed under that assumption do not apply. The problem of placing objects to maximize hit rate of such a bandwidth-constrained caching system is NP-hard in the strong sense. An aspect of the invention includes an efficient placement algorithm for when the caches have identical characteristics and that performs within a constant factor of the optimal under practical conditions. Additionally, a simulation-based evaluation of the proposed techniques indicates that a few tens of cooperating nodes are sufficient to significantly increase the hit rate even with a 1% base cache size.

Accordingly, an aspect of the invention includes determining which objects are to be shared and the node at which each such object should be cached such that the inter-cache communication bandwidth constraints are not violated. Also, in determining objects that may be shared among a set of cooperating nodes and distributing the objects to the set of cooperating nodes, considerations are made with respect to inter-cache communication bandwidth constraints, cache size constraints, object size, and popularity/access information.

As described herein, one embodiment of the invention includes placing a set of video objects at the edge elements (for example, base station (BS) or central controller (CC), such as RNC of a 3G network) of a wireless network and specifying how the objects should be shared by the edge elements to lower traffic in the wireless backhaul and core. Such techniques include determining which objects to replicate at all the caching nodes (in entirety) and which objects to place in a single node only (again, in entirety) in a cooperative caching system when the bandwidth available for inter-node communication and data transfer is limited. For each caching node, this can include specifying which video objects requested there are to be borrowed from peer nodes in "entirety" for serving to the end client when the bandwidth available for inter-node communication and data transfer is limited.

Cellular BSs and CCs are organized in a two-level hierarchy with a few hundred BSs connected to a CC. It can be assumed that any pair of BSs may communicate either directly or via their parent CC. In each case, it is assumed that the bandwidth available for transferring objects among BSs is limited. In such a setup, the challenges of placing video objects at the BSs (assuming that there is no cache at the CC) and specifying how objects should be shared (with the objective and constraints mentioned above) is considered. Accordingly, as detailed herein, an aspect of the invention includes an efficient object placement algorithm for the case of identical caches, which has a constant-factor approximation ratio under conditions expected to hold in practice. Further, the algorithm can be extended when second-level caches are available at the CCs and assumption that caches are identical can be relaxed.

The placement algorithm is centralized and one aspect includes periodically determining the placement map at a common node, such as the CC using object popularity information gathered from the BSs, distributing the map to the BSs, and letting the BSs cache newly specified objects the first time each is requested. To reduce object churn, knowledge of objects already cached at the various nodes may be used while laying out a new map.

By way of illustration, consider a cooperative caching proxy system of N nodes, 1, ..., N, where node i is provided with a cache of size $C_i$. Requests to M video objects, where the size of object j is $S_j$ bytes, each pass through one of the N nodes. If a requested object is cached at the node that receives the request, it is served from the node's local cache. The nodes are assumed to be provided with dedicated bandwidths, referred to as inter-cache communication bandwidth (ICCB), both in the upload and download directions, which may be used for letting an object cached in one of the nodes to be served from a peer node. Hence, a request that misses at a node's local cache can be served from either a peer node or the origin server.

The limits on the dedicated upload and download bandwidths at node i (for inter-cache object sharing) are denoted $B_i^u$ and $B_i^d$, respectively. The average demand in requests per second for object j at node i is denoted $R_{ij}$. An aspect of the invention includes placing a subset of M objects at the N nodes and designating how objects are shared (that is, which objects requested at a node are served by borrowing from a peer) such that the total bytes served per second from the caches (byte hit rate) is maximized. Note that because nodes have dedicated ICCB, an object served by borrowing from a peer cache is considered a hit. The set of all caches at the N nodes are referred to herein as the combined or collective cache.

Let $x_{ij}$ be a 0-1 integer variable denoting whether object i is placed at cache j. Similarly, let $x_{ijk}$ denote whether object i placed in cache j is borrowed by cache k. The problem of placing objects at the caches and determining how objects are shared to maximize the byte hit rate (O Place Gen) can then be formulated as follows:

O_Place_Gen $$\text{Maximize} \sum_{i=1}^{M} \sum_{j=1}^{N} \left( x_{ij} \cdot R_{ij} \cdot S_i + \sum_{k=1}^{N} x_{ikj} \cdot R_{ij} \cdot S_i \right) \quad (1)$$

$$\text{subject to} \sum_{i=1}^{M} S_i \cdot x_{ij} \leq C_j, \, j = 1, \ldots, N$$

$$x_{ik} + \sum_{j=1}^{N} x_{ijk} \leq 1, \, i = 1, \ldots, M, k = 1, \ldots, N \quad (2)$$

$$x_{ijk} \leq x_{ij}, \, i = 1, \ldots M, \, j, k = 1, \ldots, N \quad (3)$$

$$\sum_{i=1}^{M} \sum_{j=1}^{N} x_{ijk} \cdot R_{ik} \cdot S_i \leq B_k^u, \, k = 1, \ldots, M \quad (4)$$

$$\sum_{i=1}^{M} \sum_{k=1}^{N} x_{ijk} \cdot R_{ik} \cdot S_i \leq B_j^d, \, j = 1, \ldots, M \quad (5)$$

$$x_{ij} \in \{0, 1\}, x_{ijk} \in \{0, 1\}, \, i = 1, \ldots, M, \quad (6)$$
$$j, k = 1, \ldots, N$$

Object i served from node j, either using a copy locally cached at it or borrowed from another node k, would lead to $R_{ij} \cdot S_i$ fewer bytes per second requested from the hosting servers and transported over the core and backhaul networks. The objective function is therefore as indicated. The constraints in (1) account for the limits on the cache sizes. Constraint (2) prevents a node from both caching a node locally as well as borrowing from one or more caches, while (3) ensures that node k borrows an object i from node j only if i is cached at j. (4) and (5) ensure that the limits on uplink and downlink bandwidths available for inter-cache transport are not violated at any node.

In O_Place_Gen, the objective function and all the constraints are linear in the decision variables, so it is an integer linear program. Solving the function with generic integer program methods can therefore require exponential time. It turns out that even a simpler special case of the problem with uniform object and cache sizes, denoted S and C, respectively, identical uplink and downlink bandwidth limits, denoted B, and identical popularity distributions for objects, denoted $R_i$, at all nodes is actually NP-hard in the strong sense, so an exact solution to it or the general problem cannot be obtained in polynomial time using alternative methods either, unless P=NP. The special case, denoted O_Place_Spl, is obtained from O_Place_Gen by replacing $R_{ij}$'s and $R_{ik}$'s with $R_i$, $S_i$'s with S, Cj with C, and $B_k^u$ and $B_j^d$ with B.

The special case of the object placement problem, O_Place_Spl, is NP-hard in the strong sense. The reduction is from the 3-PARTITION problem, which is NP-complete in the strong sense. Hence, a pseudo-polynomial-time algorithm or an FPTAS are also not possible for O_Place_Spl, apart from a polynomial-time algorithm.

In designing an efficient centralized algorithm for solving O_Place_Spl, it can be assumed that there is at least one object among the top K most popular objects with bandwidth at most B/(N−1), where K=C/S, the number of objects that fit in a cache. Otherwise, the scope for cooperation would be very limited.

As described herein, an object that is cached at all N nodes is referred to as fully replicated. An object that is cached at two or more nodes, but not all nodes, is referred to as partially replicated, and one that is cached at a single node is referred to as unreplicated. An unreplicated object that is shared by all nodes is referred to as totally shared, while an unreplicated or a partially-replicated object that is shared by some but not all nodes or borrowed partly by all nodes is referred to as partially shared. An object cached at a node is referred to as partly borrowed by a peer node if part of the requests to the object at the peer node that are evenly distributed is served from the caching node. Further, an aspect of the invention includes the following rules:

Rule 1: Cache objects with the largest bandwidths (in fully-replicated, partially-replicated, or unreplicated manner).

Rule 2: Because ICCB is constrained, replicate, either fully or partially, objects of larger bandwidths.

Rule 3: Among the objects chosen for caching, unreplicate and totally share those with lower bandwidths, subject to not violating the ICCB constraints.

The above-identified rules are used in designing an efficient object-placement algorithm. As such, let O denote the set of all M objects, and let the objects be arranged in non-increasing order of their bandwidths. Start with the set of objects with the highest demand (that is, the largest bandwidth objects), referred to as $O_C$, that will fit in a cache of size C. (These will be the objects that each node caches in a non-cooperative setting when the amount of bandwidth available for sharing is zero.) These form the initial set of replicated objects, while the initial shared object set is ∅(NULL SET). Let $\overline{O}_C$ denote the set of objects in O excluding those in $O_C$. Because ICCB B is constrained, not all objects can be unreplicated and shared, and by Rule 2, high bandwidth objects should be replicated. One goal is to identify the boundary at which unreplication and sharing should commence.

Given the bandwidth constraints for sharing, the amount of data that each node serves from the combined cache can be at most B bytes per second higher than the total bandwidth of the objects in $O_C$. Each node should therefore be capable of serving up to B more bytes from the set $\overline{O}_C$. Let $O_{inc} \subseteq \overline{O}_C$ denote the set of objects brought into the combined cache when cooperation is enabled. By Rule 3, as many of these objects should be totally shared. If all the objects in $O_{inc}$ could be totally shared, then the total bandwidth of all the objects in $O_{inc}$ could be at most B. Further, for every N−1 objects brought into the combined cache, due to cache capacity constraints, at least one object from $O_C$ should be unreplicated and shared (to make room for the incoming objects). Thus, if $l=|O_{inc}|$, $L=\lceil l/(N-1) \rceil$ of the $O_C$ objects should be unreplicated and shared.

Also, consider determining L. By the ICCB constraint B, at each node, the total bandwidth of all the objects that are unreplicated and totally shared cannot exceed B/(N−1). As such, the total bandwidth of all the unreplicated and totally shared objects in the combined cache cannot exceed NB/(N−1). The objective of maximizing the total bytes served from the combined cache thus reduces to the following:

Phase 1: Choosing L objects from $O_C$ and l objects from $\overline{O}_C$ for sharing such that the total bandwidth of the objects from $\overline{O}_C$ is maximized and the constraints below hold.

(C1) $l \leq (N-1) \cdot L$ (C2) The total bandwidth of the L+l objects chosen is at most NB/(N−1)

Phase 2: Partitioning the L+l chosen objects among the N nodes such that the total bandwidth of the objects assigned to each node is at most B/(N−1).

FIG. 1 is a diagram containing a list of an object placement algorithm PA 102, according to an embodiment of the present invention. As illustrated in FIG. 1, choosing objects that should be unreplicated and totally shared is performed in the first phase in lines 8-27. In this phase, L is initially set to the number of the lowest bandwidth objects in $O_C$ with total bandwidth at most B/(N−1) (lines 8-17). If the combined bandwidth of the first (N−1)·L objects from $O_C$, $B_{inc}$, and the L objects from $O_C$, $B_{top}$, is at least NB/(N−1), then the algorithm moves to the second phase (does not enter the while loop in line 18). Note that because objects are arranged in non-increasing order of bandwidths, $B_{inc} \leq (N-1) \cdot B_{top}$ holds at every step.

On the other hand, if the combined bandwidth is less than NB/(N−1), then the while loop in line 18 is entered. L is incremented by one and l by N−1 as long as the combined bandwidth of the chosen objects is at most NB/(N−1). The first phase ends when no more objects can be brought in from $\overline{O}_C$.

In the second phase, the objects chosen for sharing are partitioned among the nodes using a best-fit decreasing approach. In the first step of this phase in lines 29-33, objects are distributed such that the total bandwidth of all the objects assigned and totally shared from a node is at most B/(N−1). In carrying out a best-fit decreasing based partitioning, the (L+l) objects for partitioning are considered in the decreasing order of their bandwidths. Also, the next object is assigned to the node with the largest residual bandwidth and capacity in cache to accommodate an incoming object (residual bandwidths of all nodes are set to B initially) and the residual bandwidth of the node to which the object is assigned is decreased by the object's bandwidth. Because distributing objects without violating the ICCB constraint is essentially a bin packing problem for which feasible solutions are known to not exist for all instances, not all objects can be expected to be successfully assigned. The remaining objects are filled in the available slots of all the caches in the next step in line 35. Exactly K−L objects (where K=C/S the number of objects that can be held in a cache) are fully replicated while no object is partially replicated. Hence, each cache can hold exactly L more objects for a total of NL objects in all the caches. Thus, because the total number of objects chosen for distribution is N·L, all objects will be successfully assigned to some cache but not all may necessarily be shared.

FIG. 2 is a diagram illustrating a placement example, according to an embodiment of the present invention. By way of illustration, and to further explain the algorithm, consider the example in FIG. 2. Here N=3 and C=6S so that K=6 and each cache (cache 206, cache 208 and cache 210) can hold exactly six objects. M=14 objects with their bandwidths indicated in the boxes. The objects in $O_C$ 202 and $\overline{O}_C$ 204 are as indicated. ICCB B is 600.

Because B=600, in the first phase, L=3 objects and l=2L=6 objects, as marked in the figure, can be selected for sharing from $O_C$ and $\overline{O}_C$, respectively. The total bandwidth of the three objects selected from $O_C$ is 321 and that of six objects selected from $\overline{O}_C$ is 579. The total bandwidth of all the nine objects is 900=NB/(N−1).

In the second phase, eight of the objects selected in the first phase can be distributed among the three caches using the heuristic in lines 30-33 such that ICCB is respected. The final object (with lowest bandwidth) is assigned to the first cache but is marked unshared as otherwise ICCB would be violated. It can be verified that the objects cannot be partitioned among the caches such that the constraints are satisfied.

Byte hit rate after cooperation increases by 579 Bps for Cache 1 and 486 bytes for each of the other two nodes. Hit rates for the latter two can be increased by 93/2=46.5 Bps by serving half their requests to the ninth object from Cache 1.

If the objects are sorted by their bandwidths, the complexity of the algorithm can be seen to be O(NK). Otherwise, it is O(N(K+log N)).

An approximation ratio of $$\frac{L+1}{L} \frac{(R+1)\ln\left(\frac{K+(N-1)L}{K+1}\right)}{R\ln\left(\frac{K+(N-1)L}{K+1}\right) - \ln\left(\frac{K+1}{\max(K-L,1)}\right)}$$

can also be derived for Algorithm PA, assuming the zipf-like distribution or its generalization, the Mzipf distribution, for object popularity distributions. The approximation ratio would hold as long as the ratio of the probability of accesses of objects with ranks i and i+1 is at most i+1/i. The above approximation ratio can be shown to be a constant for combinations of ranges of values of L, R, K, and N expected to hold in practice.

Figure 3:
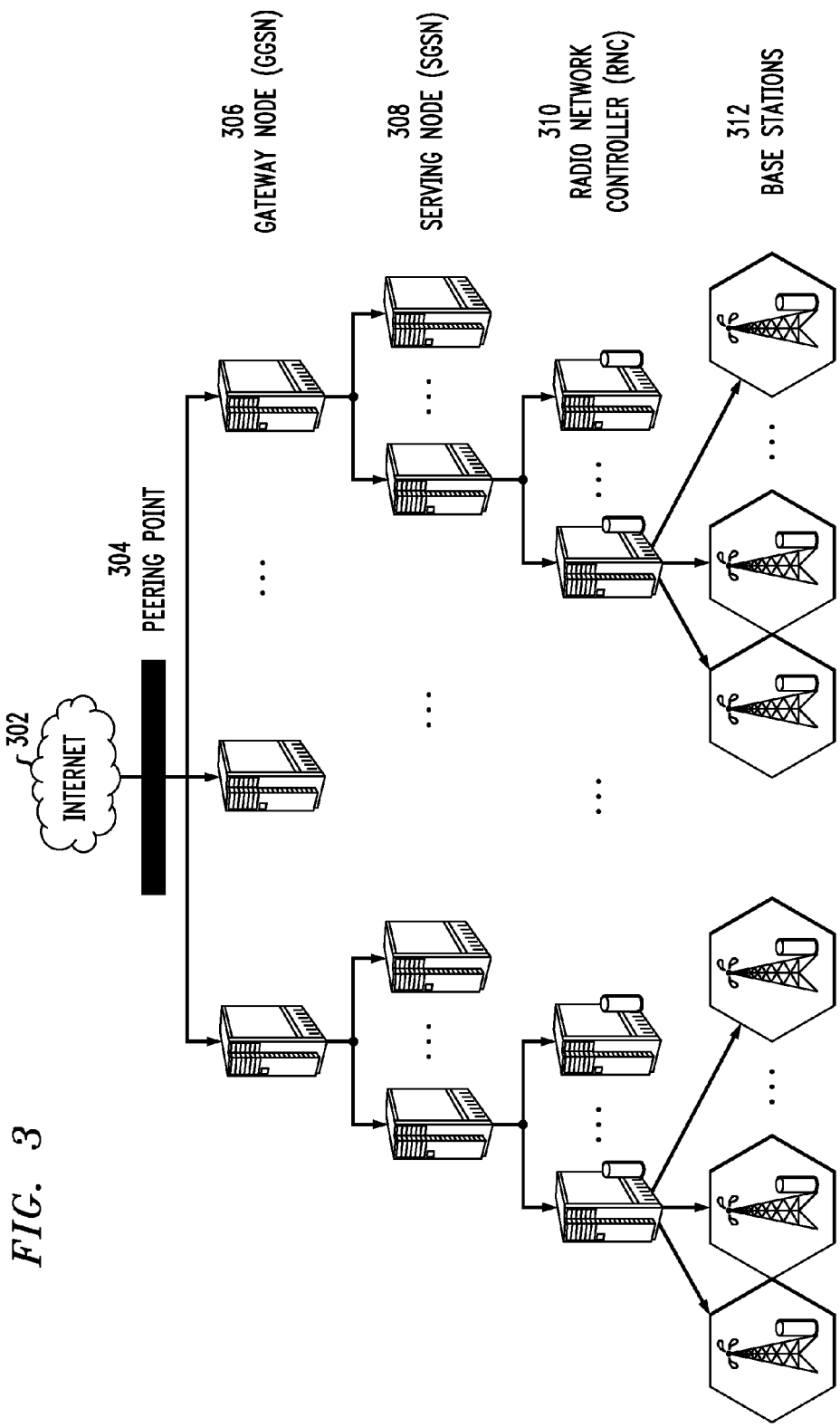
FIG. 3 is a diagram illustrating the high-level architecture of a standard existing 3G wireless network.

FIG. 3 is a diagram illustrating the hierarchical organization of networking nodes in a standard existing 3G wireless network system. By way of illustration, FIG. 3 depicts a plurality of base stations 312 connected to a radio network controller (RNC) 310, a plurality of RNCs 310 connected to a serving GPRS support node (SGSN) 308, and a plurality of SGSNs connected to a gateway GPRS support node (GGSN) 306. The gateway nodes 306 connect to the internet 302 at a peering point 304. This standard system, as illustrated, may include independent caches at RNCs and BSs.

Figure 4:
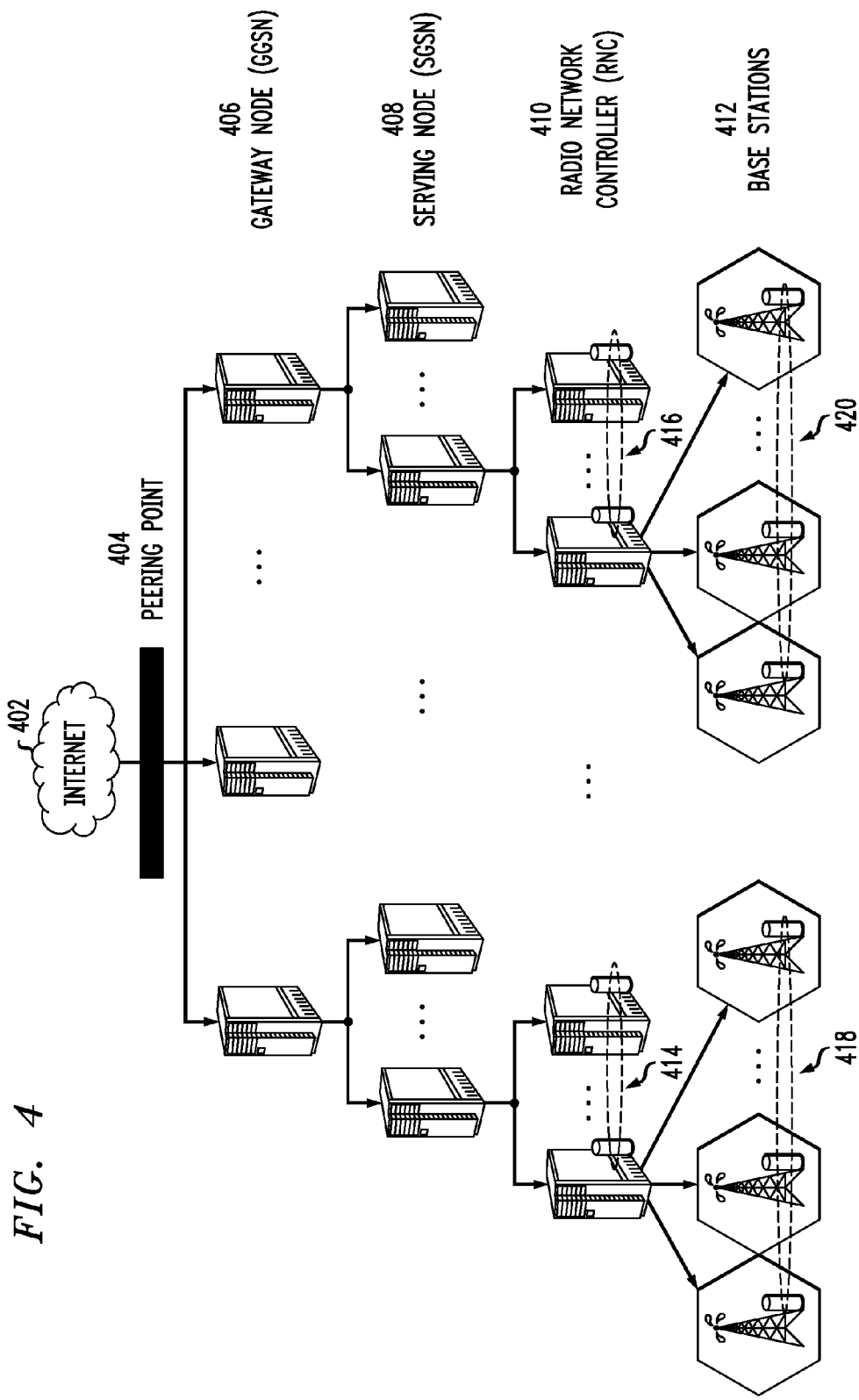
FIG. 4 is a diagram illustrating an example 3G wireless network system, according to an embodiment of the present invention.

FIG. 4 is a diagram illustrating an example system, according to an embodiment of the present invention. By way of illustration, FIG. 4 depicts the internet 402, a peering point 404, gateway nodes (GGSN) 406, serving nodes (SGSN) 408, radio network controllers (RNCs) 410 and base stations 412. The example system according to an aspect of the present invention, in contrast to the standard system of FIG. 3, includes cooperating caches at RNCs (414 and 416), BSs (418 and 420) or both to improve hit rate and lower traffic in links and nodes upstream to RNC. As illustrated herein, caches placed at the nodes that are at the same level in the hierarchy may cooperate using the techniques described herein.

Figure 5:
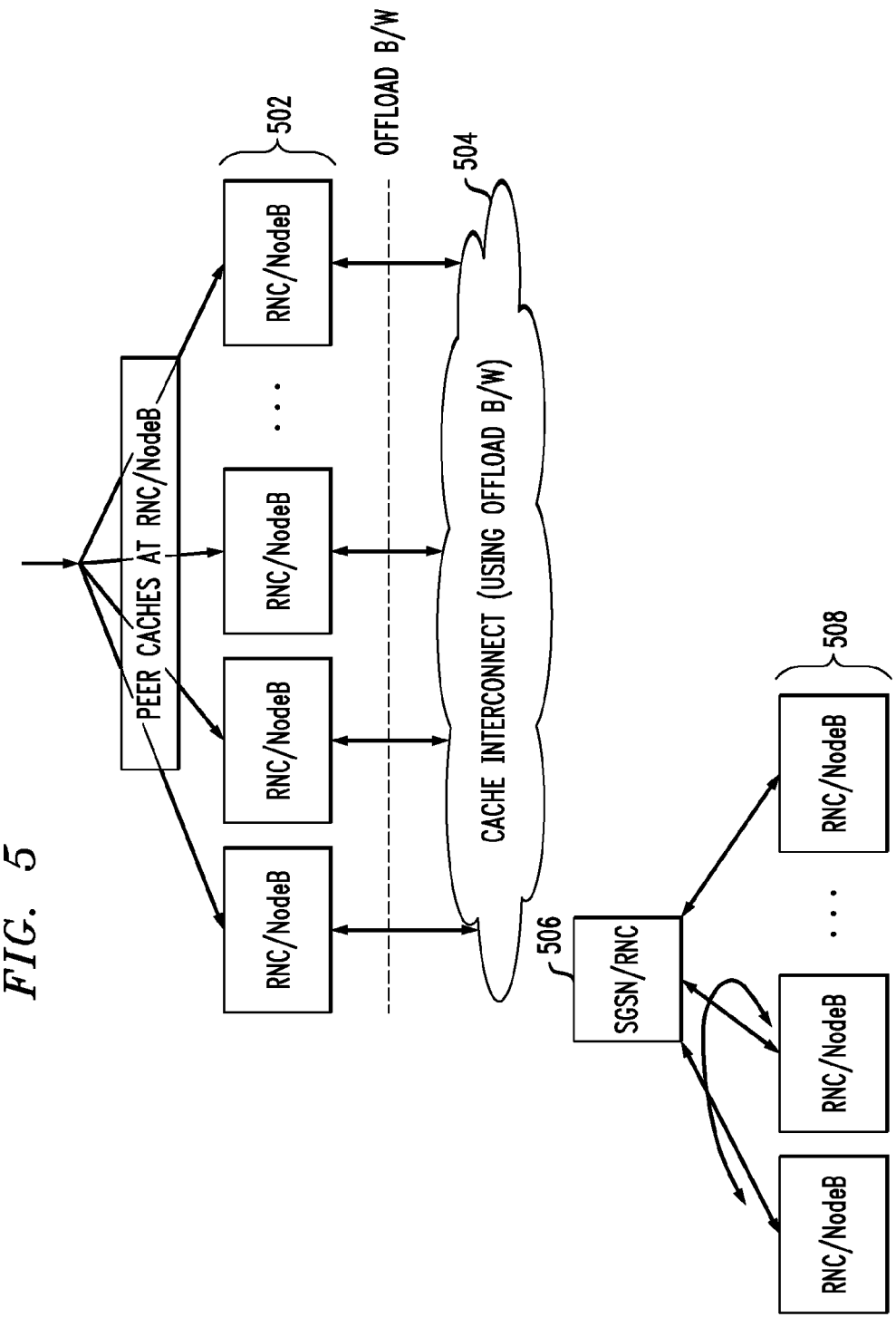
FIG. 5 is a diagram illustrating two example communication channels, according to an embodiment of the present invention.

FIG. 5 is a diagram illustrating two example communication channels for facilitating sharing of objects among peer caches, according to an embodiment of the present invention. By way of illustration, the first inset of FIG. 5 depicts one of the communication channels. In this inset, the peer caches at RNCs/NodeBs 502 communicate through a cache interconnect 504 that uses dedicated offload bandwidth. The dedicated offload may be point-to-point such as multiprotocol label switched (MPLS) links, virtual private network (VPN) connections, digital subscriber links (DSL) etc., or may be shared, such as metro Ethernet. The second inset of FIG. 5 depicts the second communication channel. Herein, the peer caches at RNCs/NodeBs 508 communicate through a hairpin bend via spare capacity in the links to parent nodes, namely, SGSN/RNC 506, respectively.

Figure 6:
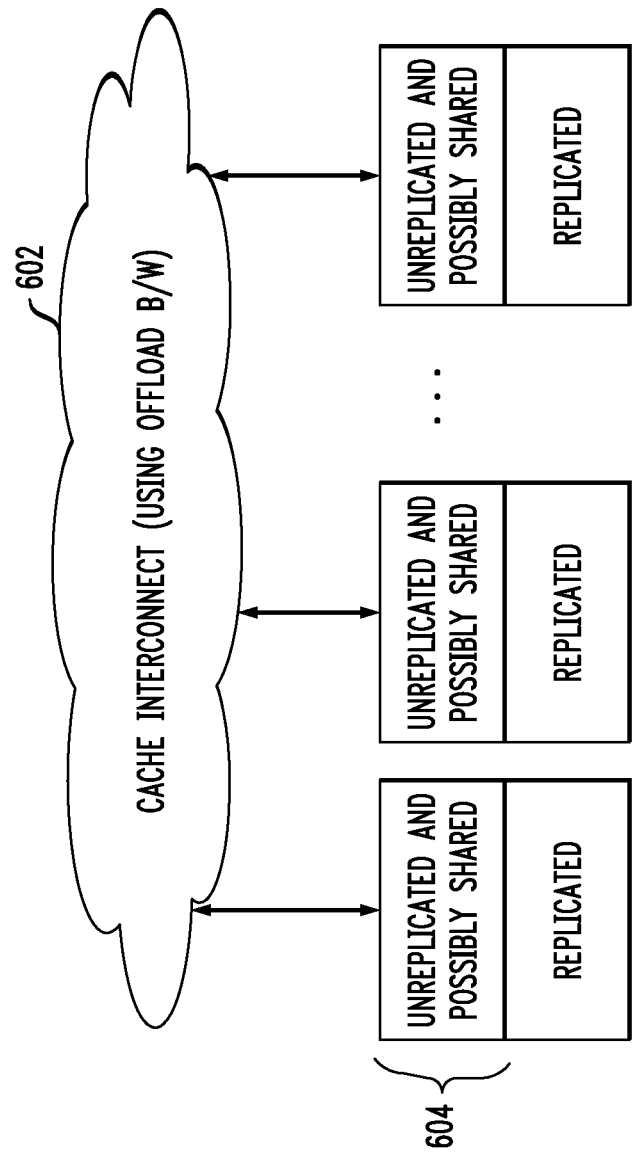
FIG. 6 is a diagram illustrating object placement, according to an embodiment of the present invention.

FIG. 6 is a diagram illustrating a set of cooperative caches in which some objects 604 are fully replicated across all the caches, and some others are unreplicated and optionally/possibly shared among two or more of the caches using dedicated cache interconnect 602. As described herein, if the number of cooperating caches=N, and the offload bandwidth per node is B, then the total bandwidth of the shared objects ~B+B/(N−1).

Figure 7:
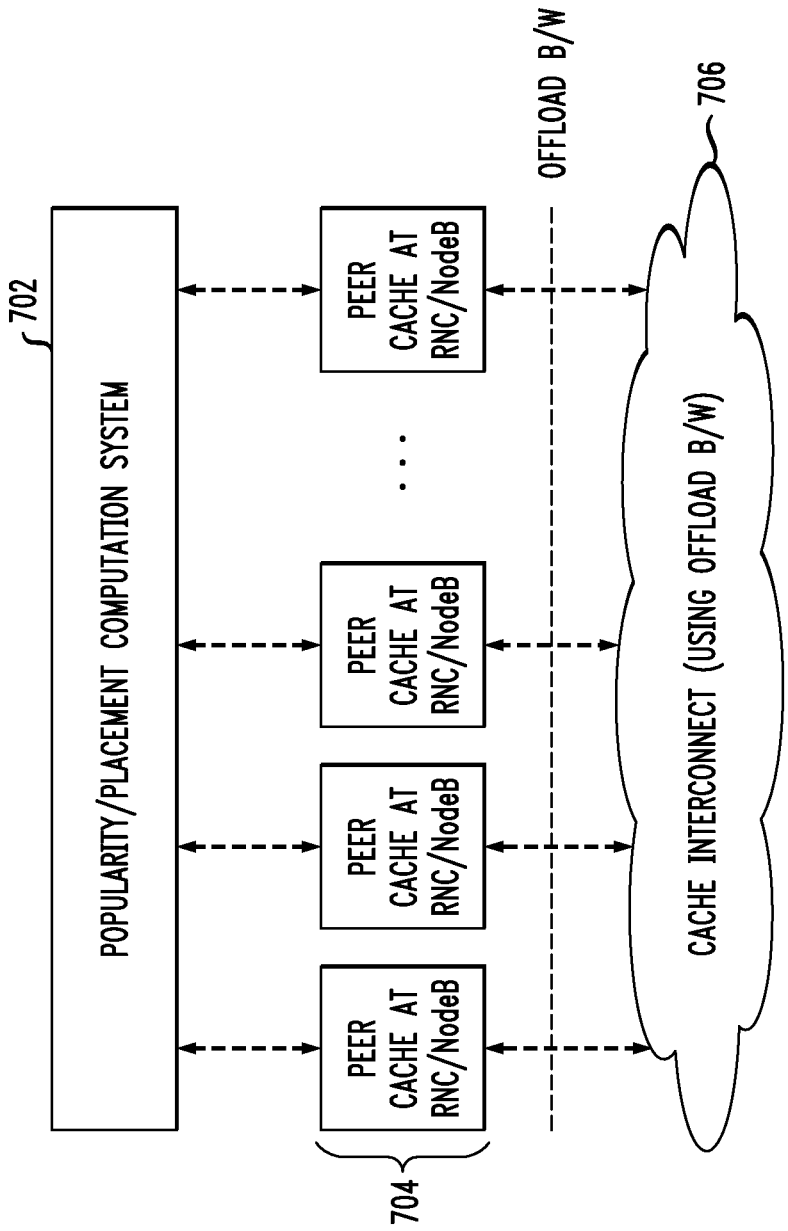
FIG. 7 is a diagram illustrating an example video object placement system, according to an embodiment of the present invention.

FIG. 7 is a diagram illustrating an example video object placement system, according to an embodiment of the present invention. By way of illustration, FIG. 7 depicts an object popularity/placement computation system 702, peer caches at RNC/NodeB 704 and a cache interconnect 706 (using offload b/w). (The caches may optionally, as indicated herein, communicate using a hairpin bend via spare capacity in the links to parent nodes.) Caching nodes inform the popularity/placement computation system (which can be one or more of the peer nodes, parent node, or an external node) of object accesses, either in an online or offline manner. The popularity/placement system determines the popularity distribution and informs the caching nodes of the objects to cache and share. Also, caching nodes update their caches as they receive and service requests (pre-fetching is not necessary).

Figure 8:
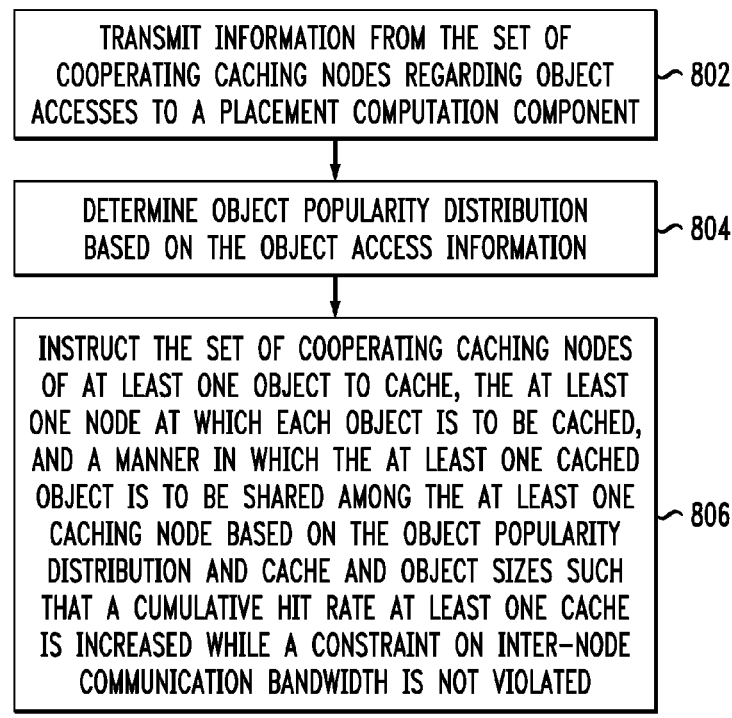
FIG. 8 is a flow diagram illustrating techniques for placing at least one object at at least one cache of a set of cooperating caching nodes with limited inter-node communication bandwidth, according to an embodiment of the invention.

FIG. 8 is a flow diagram illustrating techniques for placing at least one object (for example, a video object) at at least one cache of a set of cooperating caching nodes with limited inter-node communication bandwidth, according to an embodiment of the present invention. Step 802 includes transmitting information from the set of cooperating caching nodes regarding object accesses (and/or popularity information) to a placement computation component. Transmitting information from the set of cooperating caching nodes regarding object access to a placement computation component comprises transmitting object access information in an online manner or offline manner.

Step 804 includes determining object popularity distribution based on the object access information. This step can be carried out, for example, using a placement computation system module.

Step 806 includes instructing the set of cooperating caching nodes of at least one object to cache, the at least one node at which each object is to be cached, and a manner in which the at least one cached object is to be shared among the at least one caching node based on the object popularity distribution and cache and object sizes such that a cumulative hit rate at the at least one cache is increased or optimized while a constraint on inter-node communication bandwidth is not violated. This step can be carried out, for example, using a placement computation system module. Instructing the set of cooperating caching nodes of at least one object to cache, the at least one node at which each object is to be cached, and a manner in which the at least one cached object is to be shared among the at least one caching node based on the object popularity distribution and cache and object sizes can include instructing the set of cooperating caching nodes of at least one object to cache the at least one node at which each object is to be cached, and a manner in which the at least one cached object is to be shared among the caching nodes when object sizes, popularities, cache sizes, loads and inter-cache communication bandwidths at the set of nodes are roughly identical.

Such an aspect of the invention can include selecting m objects with the smallest bandwidth from a top-k list of objects, wherein k is the number of objects that would fit in any of the at least one cache, arranged in non-increasing order of bandwidths such that their combined bandwidth is at most B/N−1, wherein B is offload bandwidth (both uplink and downlink) and N is number of nodes. Let $\alpha_1$ denote the set of m objects so chosen. Additionally, select m(N−1) objects with largest bandwidths from objects not in the top-k list (again arranged in non-increasing order of bandwidths), that is, choose m(N−1) objects starting with $O_{K+1}$ that is $O_{K+1} \ldots O_{K+m(N-1)}$, denoted $\alpha_2$. Let $\alpha$ denote the union of sets $\alpha_1$ and $\alpha_2$, that is, the set of objects $O_{K-m+1} \ldots O_{K+m(N-1)}$. Additionally, while the sum of the bandwidths of objects in $\alpha_l$ and $\alpha_2$ is less than NB/(N−1), such an aspect of the invention further includes adding one more object to a set of all objects $\alpha_1$ chosen from the top-k list by extending a sub-list of objects chosen from top-k by one to the left, and adding N−1 objects to a set of all objects $\alpha_2$ chosen from the rest of the list by extending a sub-list of objects chosen from those not in top-k by N−1 to the right. This step is performed only if adding the objects specified does not cause the total bandwidth to exceed NB/(N−1). An embodiment of the invention further includes repeating the extension step as long as a total bandwidth of the chosen objects (that is, objects in $\alpha_1 \cup \alpha_2$) is less than NB/(N−1). The techniques also include replicating the objects not chosen from the top-k list (that is, top-k\$\alpha_1$) in all caches, partitioning the chosen objects ($\alpha_1 \cup \alpha_2$) among the N nodes using a best-fit decreasing approach, and marking as fully-shared as many chosen objects as possible from those assigned to each node such that total bandwidth of the marked objects at each node is at most B/(N−1).

Such an aspect of the invention also includes replicating objects ($O_1 \ldots O_{K-M}$) in all caches. It also includes partitioning objects in $\alpha_1 \cup \alpha_2$, that is, $O_{K-M+1} \ldots O_{K+1+(N-1)M}$, among the N caches using the best-fit decreasing algorithm such that the number of objects from this set assigned to each cache is exactly M. Further, as many objects as possible from $\alpha_1 \cup \alpha_2$ are marked as shared with every other cache such that the total bandwidth of the objects shared from each cache is at most B/(N−1).

As detailed herein, the following notations can be applied to the above steps:

$O_1, O_2, \ldots$ : list of all objects arranged in non-increasing order of bandwidths.
$b_i$: bandwidth of object i.
C: size of each cache.
S: size of each object.
K: number of objects that fit in a cache of size C (top-K objects).
$\alpha_1$: set of all the objects chosen from the top-K list.
$\alpha_2$: set of all the objects chosen from the rest of the list.

Additionally, instructing the set of cooperating caching nodes of at least one object to cache, the at least one node at which each object is to be cached, and a manner in which the at least one cached object is to be shared among the at least one caching node based on the object popularity distribution and cache and object sizes can include instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are not identical. This can include relaxing assumptions that have been described herein.

In the techniques described above, the most restrictive of the similarity characteristics assumed for the caches and objects is that of identical sizes for all the objects. Identical object popularity distributions can be expected in a cluster of a few tens of BSs, which are sufficient in practice to achieve close to ideal hit rates. This is because at least a couple of thousand BSs are typically deployed in a mid-size city and hence 20-30 BSs can be expected to cover just a fraction of a city with somewhat homogeneous object access patterns. Homogeneity would also be enhanced by the larger expected mobility within a smaller region. If there is still significant difference in the popularity distribution, one may consider sub-clusters with nearly identical distributions. Further, with unequal offload bandwidth, consider the smallest bandwidth or clusters with roughly equal bandwidths.

The assumption of identical cache sizes may be expected to hold for the same reason that the number of BSs needed for good hit rates can be found within a small geography. If the assumption does not hold, it may easily be overcome by running PA with the smallest of the cache sizes. The additional capacity in the larger caches may simply be used for storing additional objects beyond those specified by PA for higher hit rates at the larger caches.

If the loads at the nodes are not identical, techniques detailed herein may be applied assuming the largest load at any node. (This should be reasonable if loads do not differ significantly.) If there is significant difference, an aspect of the invention includes partitioning nodes based on load and applying to sub-clusters, or using a hierarchical approach.

With unequal object sizes, one may consider equal-sized object chunks or include object sizes while determining the objects to share. To be more specific, because it is the bandwidth per unit size that matters, objects should be ordered by their popularity instead of bandwidths. Next, instead of choosing N−1 objects from $\overline{O}_C$ for every object chosen from $O_C$, Algorithm PA should be modified to choose the maximum number of objects whose combined size does not exceed N−1 times the size of an object chosen from $O_C$. While non-homogeneity in object sizes can lead to inefficiencies in object selection and distribution, they can be expected to be minimal when the object pool is large.

Further, instructing the set of cooperating caching nodes of at least one object to cache can also include instructing the set of cooperating caching nodes of at least one object to share. Additionally, instructing the set of cooperating caching nodes of at least one object to cache and at least one node at which each object is to be cached includes instructing the set of cooperating caching nodes of at least one object to cache, at least one node at which each object is to be cached, and the way the cached objects are to be shared among the caching nodes such that an inter-cache communication bandwidth constraint is not violated.

An aspect of the invention also includes determining which of multiple objects to replicate at all caching nodes and which of multiple objects to place in a single node only. Determining which of multiple objects to replicate at all caching nodes and which of multiple objects to place in a single node only can include using object size and popularity, load, cache size, and upload/download bandwidths for communication at each node.

The techniques depicted in FIG. 8 can additionally include updating a cache of a caching node as an additional request is received.

The techniques depicted in FIG. 8 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a placement computation system module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 9:
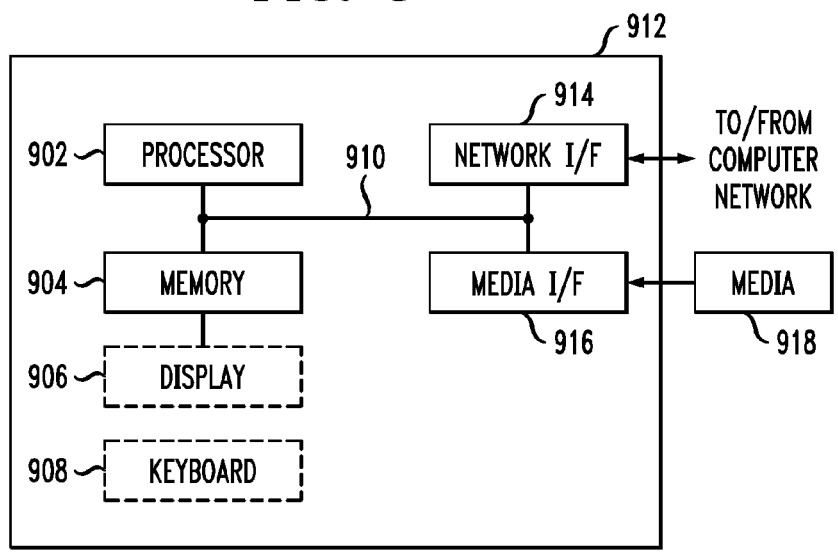
FIG. 9 is a system diagram of an exemplary computer system on which at least one embodiment of the invention can be implemented.

Additionally, an aspect of the present invention can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may, by way of example, execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention.

In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown and/or described herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, distributing objects to a set of cooperating nodes by considering inter-cache communication bandwidth constraints.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for placing at least one object at at least one cache of a set of cooperating caching nodes with limited inter-node communication bandwidth, wherein the method comprises:
    transmitting information from the set of cooperating caching nodes regarding object accesses to a placement computation component;
    determining object popularity distribution based on the object access information; and
    instructing, on a periodic basis, the set of cooperating caching nodes of (i) at least one object to cache, (ii) the at least one node at which each object is to be cached, and (iii) a manner in which the at least one cached object is to be shared among the at least one caching node based on (a) the object popularity distribution, (b) cache size, and (c) object size such that a cumulative hit rate at the at least one cache is increased while a constraint on inter-node communication bandwidth is not violated;
    selecting a number, L, of objects from a list of k objects, wherein k is a number of objects that would collectively fit in any single cache of the at least one cache, arranged in a non-increasing order of bandwidths relative to the sequentially previous element such that the L objects have a combined bandwidth of at most $B/N-1$, wherein B is offload bandwidth and N is number of nodes;
    selecting $(N-1)L$ objects with largest bandwidths from objects not in the list of k objects;
    adding one more object to a set of all objects $\alpha_1$ chosen from the list of k objects by extending a sub-list of objects chosen from the list of k objects by one, and adding $N-1$ objects to a set of objects $\alpha_2$ by extending a sub-list of objects chosen from those objects not in the list of k objects by $N-1$ if a total bandwidth of the L objects selected in the previous two steps and the objects identified in this step is at most $NB/(N-1)$;
    repeating (i) said extending the sub-list of objects chosen from the list of k objects by one and (ii). said extending the sub-list of objects chosen from those not in the list of k objects by $N-1$ as long as a total bandwidth of the L selected objects and the objects identified in (i) said extending of the sub-list of objects chosen from the list of k objects and (ii) said extending of the sub-list of objects chosen from those not in list of k objects is at most $NB/(N-1)$;
    replicating the set of objects $\alpha_2$ in all caches;
    partitioning the chosen objects $\alpha_1$ among the N nodes in decreasing order of object bandwidth;
    wherein at least one of the steps is carried out by a computer device.

2. The method of claim 1, wherein instructing the set of cooperating caching nodes of at least one object to cache, the at least one node at which each object is to be cached, and a manner in which the at least one cached object is to be shared among the at least one caching node based on the object popularity distribution and cache and object sizes comprises instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are identical.

3. The method of claim 2, further comprising:
    marking as fully-shared as many chosen objects as possible from those assigned to each node such that total bandwidth of the marked objects at each node is at most $B/(N-1)$.

4. The method of claim 1, wherein instructing the set of cooperating caching nodes of at least one object to cache, the at least one node at which each object is to be cached, and a manner in which the at least one cached object is to be shared among the at least one caching node based on the object popularity distribution and cache and object sizes comprises instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are not identical.

5. The method of claim 1, further comprising:
    updating a cache of a caching node as an additional request is received.

6. The method of claim 1, wherein an object comprises a video object.

7. The method of claim 1, wherein transmitting information from the set of cooperating caching nodes regarding object access to a placement computation component comprises transmitting object access information in an online manner.

8. The method of claim 1, wherein transmitting information from the set of cooperating caching nodes regarding object access to a placement computation component comprises transmitting information in an offline manner.

9. The method of claim 1, wherein instructing the set of cooperating caching nodes of at least one object to cache, the at least one node at which each object is to be cached, and a manner in which the at least one cached object is to be shared among the at least one caching node based on the object popularity distribution and cache and object sizes comprises determining which of multiple objects to replicate at all caching nodes and which of multiple objects to place in a single node only.

10. The method of claim 9, wherein determining which of multiple objects to replicate at all caching nodes and which of multiple objects to place in a single node only comprises using object size and popularity, load, cache size, and upload/download bandwidths for communication at each node.

11. The method of claim 1, further comprising:
providing a system, wherein the system comprises at least one distinct software module, each distinct software module being embodied on a tangible computer-readable recordable storage medium, and wherein the at least one distinct software module comprises a placement computation system module executing on a hardware processor.

12. An article of manufacturing comprising a non-transitory computer readable storage memory having computer readable instructions tangibly embodied thereon which, when implemented, cause a computer to carry out a plurality of method steps comprising:
transmitting information from the set of cooperating caching nodes regarding object accesses to a placement computation component;
determining object popularity distribution based on the object access information; and
instructing, on a periodic basis, the set of cooperating caching nodes of (i) at least one object to cache, (ii) the at least one node at which each object is to be cached, and (iii) a manner in which the at least one cached object is to be shared among the at least one caching node based on (a) the object popularity distribution, (b) cache size, and (c) object size such that a cumulative hit rate at the at least one cache is increased while a constraint on inter-node communication bandwidth is not violated;
selecting a number, L, of objects from a list of k objects, wherein k is a number of objects that would collectively fit in any single cache of the at least one cache, arranged in a non-increasing order of bandwidths relative to the sequentially previous element such that the L objects have a combined bandwidth of at most B / N−1, wherein B is offload bandwidth and N is number of nodes;
selecting (N−1)L objects with largest bandwidths from objects not in the list of k objects;
adding one more object to a set of all objects $\alpha_I$ chosen from the list of k objects by extending a sub-list of objects chosen from the list of k objects by one, and adding N−1 objects to a set of objects $\alpha_2$ by extending a sub-list of objects chosen from those objects not in the list of k objects by N−1 if a total bandwidth of the L objects selected in the previous two steps and the objects identified in this step is at most NB/(N−1);
repeating (i) said extending the sub-list of objects chosen from the list of k objects by one and (ii). said extending the sub-list of objects chosen from those not in the list of k objects by N−1 as long as a total bandwidth of the L selected objects and the objects identified in (i) said extending of the sub-list of objects chosen from the list of k objects and (ii) said extending of the sub-list of objects chosen from those not in list of k objects is at most NB/(N−1);
replicating the set of objects $\alpha_2$ in all caches;
partitioning the chosen objects $\alpha_I$ among the N nodes in decreasing order of object bandwidth.

13. The article of manufacture of claim 12, wherein instructing the set of cooperating caching nodes of at least one object to cache, the at least one node at which each object is to be cached, and a manner in which the at least one cached object is to be shared among the at least one caching node based on the object popularity distribution and cache and object sizes comprises instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are identical.

14. The article of manufacture of claim 12, wherein instructing the set of cooperating caching nodes of at least one object to cache, the at least one node at which each object is to be cached, and a manner in which the at least one cached object is to be shared among the at least one caching node based on the object popularity distribution and cache and object sizes comprises instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are not identical.

15. The article of manufacture of claim 12, wherein instructing the set of cooperating caching nodes of at least one object to cache, the at least one node at which each object is to be cached, and a manner in which the at least one cached object is to be shared among the at least one caching node based on the object popularity distribution and cache and object sizes comprises determining which of multiple objects to replicate at all caching nodes and which of multiple objects to place in a single node only.

16. The article of manufacture of claim 15, wherein determining which of multiple objects to replicate at all caching nodes and which of multiple objects to place in a single node only comprises using object size and popularity, load, cache size, and upload/download bandwidths for communication at each node.

17. The article of manufacture of claim 12, wherein the computer readable instructions which, when implemented, further cause a computer to carry out a method step comprising:
updating a cache of a caching node as an additional request is received.

18. A system for placing at least one object at least one cache of a set of cooperating caching nodes with limited inter-node communication bandwidth, comprising:
at least one distinct software module, each distinct software module being embodied on a tangible computer-readable medium;
a memory; and
at least one processor coupled to the memory and operative for:
transmitting information from the set of cooperating caching nodes regarding object accesses to a placement computation component;
determining object popularity distribution based on the object access information; and
instructing, on a periodic basis, the set of cooperating caching nodes of (i) at least one object to cache, (ii) the at least one node at which each object is to be cached, and (iii) a manner in which the at least one cached object is to be shared among the at least one caching node based on (a) the object popularity distribution, (b) cache size, and (c) object size such that a cumulative hit rate at the at least one cache is increased while a constraint on inter-node communication bandwidth is not violated;
selecting a number, L, of objects from a list of k objects, wherein k is a number of objects that would collectively fit in any single cache of the at least one cache, arranged in a non-increasing order of bandwidths relative to the sequentially previous element such that the L objects have a combined bandwidth of at most B / N−1, wherein B is offload bandwidth and N is number of nodes;

selecting (N−1)L objects with largest bandwidths from objects not in the list of k objects;

adding one more object to a set of all objects $\alpha$ chosen from the list of k objects by extending a sub-list of objects chosen from the list of k objects by one, and adding N−1 objects to a set of objects $\alpha_2$ by extending a sub-list of objects chosen from those objects not in the list of k objects by N−1 if a total bandwidth of the L objects selected in the previous two steps and the objects identified in this step is at most NB/(N−1);

repeating (i) said extending the sub-list of objects chosen from the list of k objects by one and (ii). said extending the sub-list of objects chosen from those not in the list of k objects by N−1 as long as a total bandwidth of the L selected objects and the objects identified in (i) said extending of the sub-list of objects chosen from the list of k objects and (ii) said extending of the sub-list of objects chosen from those not in list of k objects is at most NB/(N−1);

replicating the set of objects $\alpha_2$ in all caches;

partitioning the chosen objects $\alpha_1$ among the N nodes in decreasing order of object bandwidth.

19. The system of claim 18, wherein the at least one processor coupled to the memory operative for instructing the set of cooperating caching nodes of at least one object to cache, the at least one node at which each object is to be cached, and a manner in which the at least one cached object is to be shared among the at least one caching node based on the object popularity distribution and cache and object sizes is further operative for instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are identical.

20. The system of claim 18, wherein the at least one processor coupled to the memory operative for instructing the set of cooperating caching nodes of at least one object to cache, the at least one node at which each object is to be cached, and a manner in which the at least one cached object is to be shared among the at least one caching node based on the object popularity distribution and cache and object sizes is further operative for instructing the set of cooperating caching nodes of at least one object to cache, at least one node at which each object is to be cached, and a manner in which the at least one cached object is to be shared among the at least one caching node when object sizes, popularities, cache sizes, loads and inter-cache communication bandwidths at the set of nodes are not identical.

21. The system of claim 18, wherein the at least one processor coupled to the memory operative for instructing the set of cooperating caching nodes of at least one object to cache, the at least one node at which each object is to be cached, and a manner in which the at least one cached object is to be shared among the at least one caching node based on the object popularity distribution and cache and object sizes is further operative for determining which of multiple objects to replicate at all caching nodes and which of multiple objects to place in a single node only.

22. The system of claim 21, wherein the at least one processor coupled to the memory operative for determining which of multiple objects to replicate at all caching nodes and which of multiple objects to place in a single node only is further operative for using object size and popularity, load, cache size, and upload/download bandwidths for communication at each node.

23. The system of claim 18, wherein the at least one processor coupled to the memory is further operative for:

updating a cache of a caching node as an additional request is received.

* * * * *